June 26, 1962 J. R. RASQUIN ET AL 3,041,587
ANGULAR MEASUREMENT SYSTEM
Filed Aug. 28, 1961 2 Sheets-Sheet 1

ROBERT J. SCHWINGHAMER
JOHN R. RASQUIN
INVENTORS

BY
ATTORNEYS

June 26, 1962  J. R. RASQUIN ET AL  3,041,587
ANGULAR MEASUREMENT SYSTEM
Filed Aug. 28, 1961  2 Sheets-Sheet 2

ROBERT J. SCHWINGHAMER
JOHN R. RASQUIN
INVENTORS

BY
G. W. O'Brien
C. A. Phillips
ATTORNEYS

United States Patent Office 3,041,587
Patented June 26, 1962

3,041,587
ANGULAR MEASUREMENT SYSTEM
John R. Rasquin and Robert J. Schwinghamer, Huntsville, Ala., assignors to the United States of America as represented by the Administrator of the National Aeronautics and Space Administration
Filed Aug. 28, 1961, Ser. No. 134,479
10 Claims. (Cl. 340—198)
(Granted under Title 35, U.S. Code (1952), sec. 266)

The invention described herein may be manufactured and used by or for the Government of the United States of America for governmental purposes without the payment of any royalties thereon or therefor.

This invention relates to angular indicating and measurement devices and particularly to an improved intermediate accuracy angular measurement system.

There are two general types of angular indicating or measurement systems being used today. One employs digital coding and is capable of a very high degree of accuracy. The second type is the well known synchro or selsyn transmitter-receiver system employing a form of synchronous motor. While the first type mentioned is extremely accurate it is also extremely complicated, requires relatively elaborate equipment and is susceptible to error where the operating constants of the system are not held to rigid standards. The ordinary synchro type system, on the other hand, does not provide sufficient accuracy for many applications. Thus there is a void between simple coarse angular measurement devices and very complex, accurate devices.

It is the object of the present invention to provide a simplified type of angular indicating, measurement or determining system which is inherently rugged and will provide substantially greater accuracy than a common synchrotype system over a 360° range.

In accordance with the invention an angular indicating instrument or system would be constructed in which the angular rotation to be monitored is coupled to means for translating the rotation into separate electrical output signals representative of the sine and cosine of the angular rotation from a reference position. The system includes means for sensing when rotation reaches or passes through approximately 45°, 135°, 225° and 315°. This means for sensing would then energize switches which would selectively provide either a sine or cosine output in accordance with this schedule. From 315° to 45° and 135° to 225°, there would be a sine output, and from 45° to 135° and 225° to 315° there would be a cosine output. It has been found that in this manner a very sensitive angular indication can be obtained. This indication, which is in electrical form, may be either electrically employed to control angular positioning equipment, as by servo means, or read out as a visual indication of position as by a volt-meter precalibrated for this purpose. As the system thus far described will provide the same analog output in each 90° increment, commencing with 45°, sensing means are added to indicate to which of these increments or quadrants the output or output readings refer.

The features of our invention which are believed to be novel are set forth with particularity in the claims. The invention itself, both as to its organization and method of operation, together with further objects and advantages thereof, may be best understood by reference to the following description considered in conjunction with the accompanying drawings in which:

Figure 1:
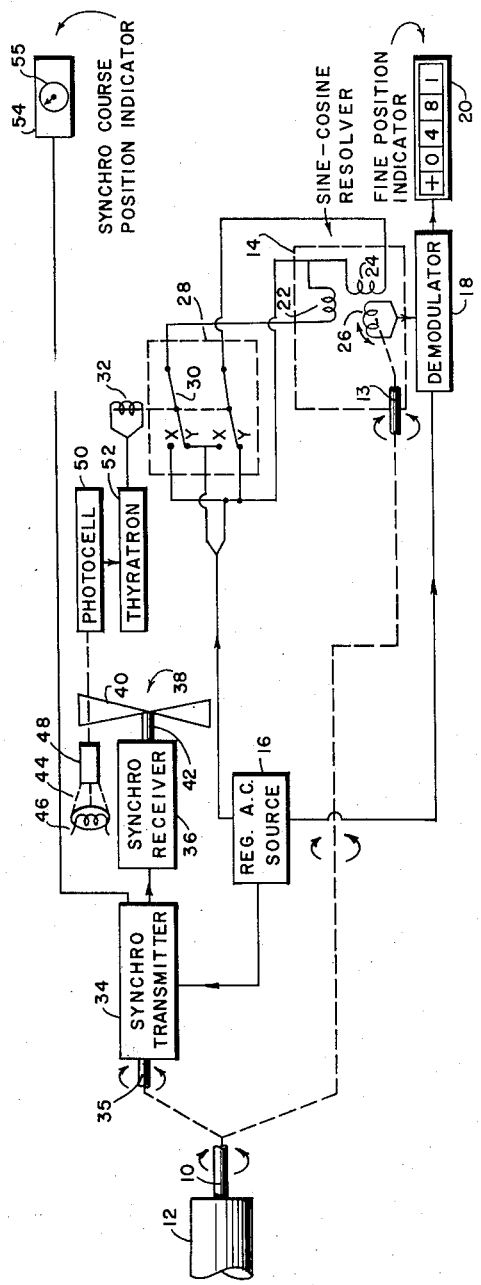
FIGURE 1 is a diagrammatic illustration of an embodiment of the invention.

In the embodiment of the invention illustrated in FIGURE 1, follower means, such as mechanical coupling or shaft 10, is employed to repeat the rotation of body 12, the rotation of which is to be observed. Shaft 10 is rotationally connected with shaft 13 of means, such as sine-cosine resolver 14, for providing electrical outputs proportional to the sine and cosine of the rotation of shaft 10 from a reference position. Resolver 14 is energized by a regulated, constant amplitude source 16 of alternating current (A.C.) voltage.

The output of sine-cosine resolver 14 is fed as a first alternating current input to demodulator 18 and an output of alternating current source 16 is fed as a second input to demodulator 18. The two inputs are synchronously compared or rectified by demodulator 18 to provide a direct current output to "fine" position indicator 20 which is proportional in magnitude to the first input to demodulator 18 and in sign to the phase of the first input to demodulator 18. As illustrated, fine position indicator 20 is a direct current, direct reading, digital voltmeter indicating both the sign and magnitude of the demodulator output voltage.

Resolver 14 is of a known type of rotary transformer having a stator illustrated by stator coils 22 and 24 oriented at a relative 90° and a rotor likewise comprising two coils oriented at a relative 90° but with only one of them, rotor coil 26, being used here and thus shown as illustrating the rotor. The axes for the coils are in the plane of the paper. Stator coils 22 and 24 are selectively energized from regulated alternating current source 16 through switching means, which include switch 28, to provide, selectively, primary flux fields which differ by 90°. Coil 26 thus may be energized, selectively, by flux fields differing by 90°, the phase difference of sine-cosine functions.

Figure 2:
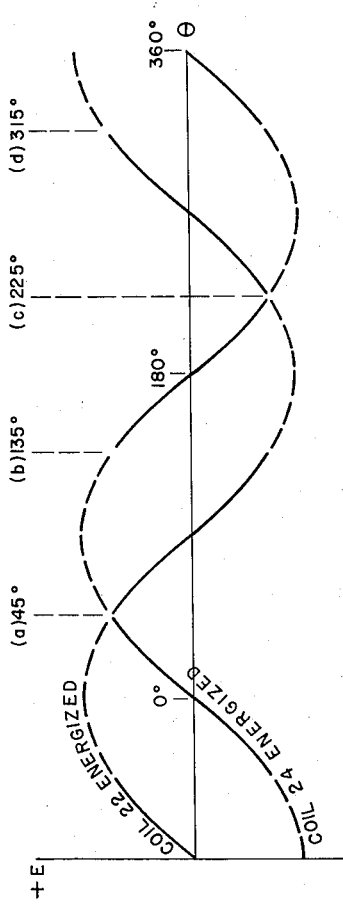
FIGURE 2 is a graphic illustration of an operating characteristic of the invention.

FIGURE 2 provides a plot of the output voltage (E) of fine position indicator 20 versus the angular position $\theta$ of coil 26 with respect to coils 22 and 24. This output voltage, which is represented by solid lines, is a composite of the outputs derived by alternately energizing coils 22 and 24 in accordance with the schedule described above. Without regard to this schedule, assume that movable contacts or contactor means 30 of switch 28 are in a lower or Y position (FIGURE 1) and coil 22 is energized as shown. As a result there would be maximum coupling between coil 22 and secondary output coil 26, which is positioned with its axis parallel to that of coil 22. This arrangement, and with appropriate phasing of the inputs to resolver 14 and demodulator 18, produces a maximum positive output voltage from demodulator 18 and if the angular position of shaft 10, which is rotationally linked to output coil 26, were calibrated as 0° we could assign a proportional value of unity to this output voltage and it would represent the cosine of 0°, a reference position. As shaft 10 is rotated by an angle $\theta$ from the reference position, the output voltage from coil 26 (energized by coil 22) decreases at a cosine rate and when shaft 10, and thus coil 26, is rotated 90°, the axes of coils 22 and 26 will be perpendicular and provide zero or minimum coupling, and thus zero or minimum output voltage from coil 26 and demodulator 18 indicating the cosine of 90°. If, instead, primary coil 24 has been energized (movable contacts 30 in their upper or X position) the variation would have been sinusoidal from zero output at 0° (the same reference position) to unity output at 90°. The output voltages are of course indicated by indicator 20.

From an examination of the sine-cosine curves illustrated in FIGURE 2, it will be appreciated that the most sensitive regions of change in output voltage indicated by indicator 20 with changes in the angle θ of shaft 10, that is where $$\frac{\Delta E}{\Delta \theta}$$

is maximum, occurs when the orientation of the axis of output coil 26 with respect to the axis of a driving coil (coil 22 or 24) is within ±45°. Accordingly, switching means are employed by the invention to provide for alternately switching from coil 24 to 22 at 45° (switching point "a") and 225° (switching point "c") and from coil 22 to coil 24 at 135° (switching point "b") and 315° (switching point "d"). Switching is accomplished at these switch points by switching signal means which control electromagnet 32 which in turn controls the position of contacts 30 of switch 28. The switching signal means includes synchro-transmitter 34, rotationally driven through shaft 35 by shaft 10, and synchro-receiver 36 is connected to and driven by the electrical output of synchro-transmitter 34. Shutter 38, consisting of two oppositely positioned 90° opaque segments 40 of a circle, is mounted on shaft 42 of synchro-receiver 36. A light beam 44 from light source 46, and collimated by lens 48, is directed to photocell 50 via a path which is through the circular path of shutter 38. The light beam is unblocked by shutter 38 when shaft 42, synchronized or following shaft 10 and thus coil 26, is positioned between 45° and 135° and between 225° and 315°, and is blocked when the shaft corresponds to positions between 135° and 225° and between 315° and 45°. These positions are with respect to the axis of stator coil 24 as an angular reference, which axis may be initially oriented to any desired angular position. The switching signal means also includes a switching signal amplifier, such as thyratron control circuit 52, which in response to the output of photocell 50 energizes electromagnet 32 when light is received by photocell 50.

The reference position of coil 26 with respect to shaft 10, the shaft position of shutter 38, and the direction of pull of electromagnet 32 upon switching contacts 30 are all aligned to provide a switching signal each 90° of rotation of shaft 10 which causes contacts 30 to reside in either a contact X position or contact Y position appropriate to provide a sine output from output coil 26 for positions of shaft 10, relative to the reference position, of 315° to 45° and 135° to 225°, and a cosine output for positions of shaft 10 which are within 45° to 135° and 225° to 315°.

By precalibration of indicator 20 in terms of both coils 22 and 24, as by test runs or by the use of Fourier series in a digital computer, and knowing the quadrant, the angular position of shaft 10 is indicated, as stated above, by a voltage readout of indicator 20. As a means of determining which of the quadrants a reading is to be referred to, and thus the actual angle, a "coarse" position synchro-indicator 54 is provided. As shown, this indicator is energized by an output of synchro-transmitter 34 and it comprises a synchro-receiver and a compass rose 55 upon which the coarse angle (±1°) is displayed. As in practice there are usually differences in the characteristics of input coils 22 and 24 which will provide distinct changes in output as these coils are switched, this in itself signals a change from one coil to the other and thus the exact switching point need not be determined precisely from coarse indicator 54. Synchro-transmitter 34 is mechanically linked to and provides angular alignment with resolver 14, also connected to shaft 10. Synchro-transmitter 34, synchro-receiver 36, and synchro-indicator 54 are powered with a reference voltage from regulated alternating current source 16.

Figure 3:
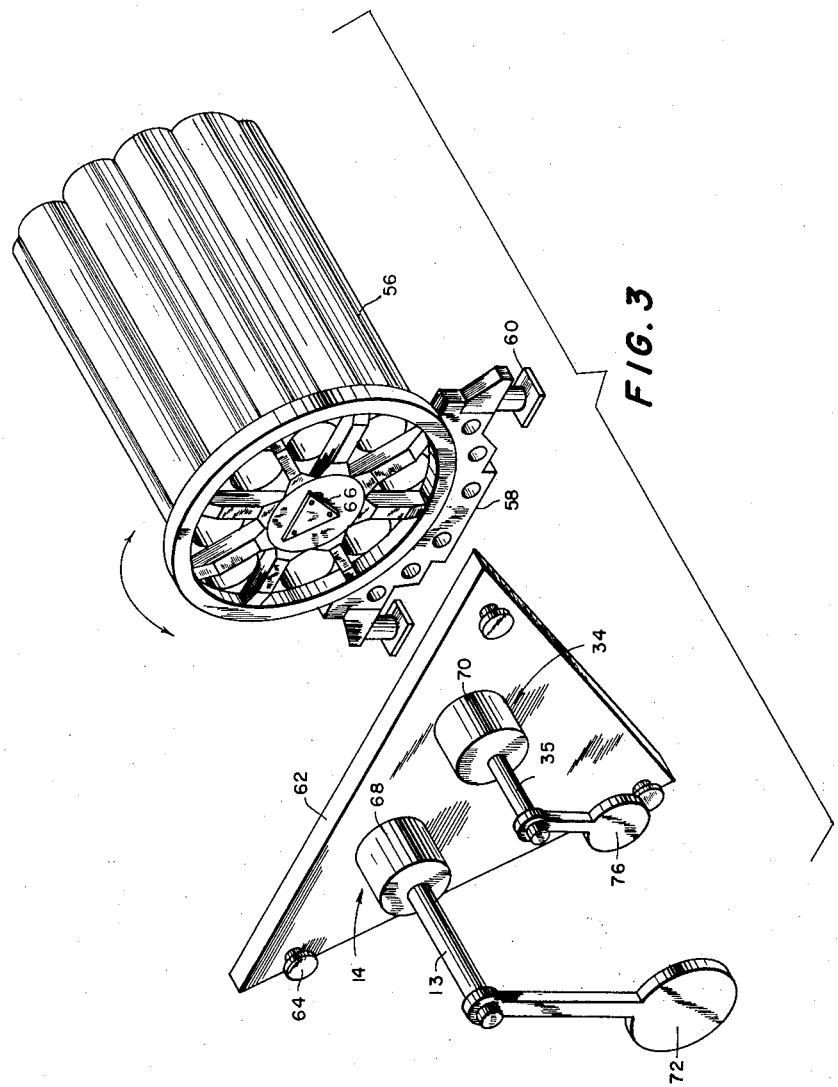
FIGURE 3 is an exploded perspective view of a mechanical arrangement of angular sensing elements employed in an embodiment of the invention.

As a further illustration of the invention, reference is made to FIGURE 3 where the combination of elements just discussed is combined with other elements to indicate precisely the "roll" orientation of a large missile 56. The missile is rotatable upon a mounting frame 58 (by means of rollers not shown) which in turn is supported by legs 60. Mounting bracket 62, which provides the function of mechanical coupling 10 of FIGURE 1, is attached by bolt connectors 64 to a face plate 66 at one end of the missile and this bracket supports in a fixed manner the outer cases 68 and 70, and thus the stators or stator members of sine-cosine resolver 14 and synchro-transmitter 34, respectively. Gravity means are employed to provide a vertical angular reference for the system illustrated here and to accomplish this, pendulum 72 is connected to and suspended by shaft 13 of the rotor or rotor member of resolver 14 and pendulum 76 is connected to and suspended by shaft 35 of the rotor or rotor member of synchro-transmitter 34. The alignment of the pendulums is such as to provide at one roll position of the missile (which may be arbitrarily determined) a 0° output from synchro-transmitter 34, and a corresponding zero voltage, first quadrant (315°–45°) sine output from resolver 14 indicating 0°. The length, positioning and spacing of pendulums 72 and 76 are adjusted to allow for 360° rotation of mounting bracket 62 and missile 56 without interference between the pendulums as they maintain a vertical position.

Inasmuch as in dealing with the sine-cosine resolver 14 and the synchro transmitters and receivers employed here it is relative movement between the rotor and stator of each of these which is involved, it is to be understood that the mechanical connections may be reversed without changing the operation of either. By this it is meant that instead of the cases of resolver 14 and transmitter 34 being fixedly mounted on bracket 62 and the pendulums suspended by shafts 13 and 35, the shafts could have been connected to mounting bracket 62 and the cases to the pendulums. Likewise it is to be understood that either set of coils (stator or rotor) of resolver 14 may be energized and the output taken from one coil of the other set. An alternate means for sensing and obtaining a switching signal at 90° increments could be provided by placing shutter 38 directly on shaft 35 of synchro-transmitter 34 or on shaft 13 of resolver 14. Another variation would be to combine the function of shutter 38 with pendulum 72 or 76 in a single circular member in which the shutter would consist of two oppositely positioned 90° annular slots through which the light beam from lens 48 would pass, and the pendulum portion would be a weighted segment, such as iron, in an otherwise light metal, such as aluminum, construction. By these alternate approaches receiver 36 could be eliminated.

The operation of the system of the invention further illustrated by FIGURE 3 is the same as that described above with regard to FIGURE 1, and as graphically depicted by FIGURE 2. As shown by the latter, a cosine output of resolver 14 is provided when coil 22 is energized and a sine output when coil 24 is energized. Switching between the coils in the manner discussed above is adjusted to utilize the sine output over its steepest portions, which it will be noted exist primarily from 315° to 45° and 135° to 225°, and to utilize the cosine output over its steepest portions, which exist between 45° and 135° and between 225° and 315°. These outputs which, as described, are demodulated by demodulator 18 and fed to "fine" position indicator 20 result in angular readout information accurate within ± one minute of arc. The particular significance of this figure of accuracy in this invention is that the accuracies are obtained with relatively simple and rugged individual elements, such as resolver 14 and demodulator 18, and without a complex interconnection of them.

While there have been described what are at present considered preferred embodiments of the invention, it will be obvious to those skilled in the art that various substitutions of elements and modifications and interconnections of these elements may be made without departing from the invention; and it is aimed in the appended claims to cover all such changes and modifications disclosed as are within the true spirit and scope of the invention.

We claim:

1. An angular indicating system comprising follower means adapted to be coupled to a rotatable body the rotation of which is to be observed for repeating the angular rotation of said body, electrical means coupled with said follower means for providing a first electrical output proportional to the sine of the angle through which said follower means is rotated from a reference position and for providing a second electrical output proportional to the cosine of the angle through which said follower means is rotated from said reference position, switching means coupled with said electrical means for selectively providing in an alternating sequence said first and second outputs as a selected output, which selected output alternates in response to a switching signal, switching signal means responsive to said follower means for providing said switching signal to said switching means each 90° of rotation of said follower means, said switching signal means being aligned to provide as said selected output said first output for angular rotation of said follower means from said reference position of angles through a first quadrant between 315° and 45° and a third quadrant between 135° and 225°, and said second output for angles through a second quadrant between 45° and 135° and a fourth quadrant between 225° and 315°, means responsive to said selected output for indicating said selected output, and coarse indicating means responsive to said follower means for indicating at least which of said quadrants the angle repeated by said follower means is within.

2. The angular indicating system set forth in claim 1 wherein said coarse indicating means comprises a synchro-transmitter rotationally coupled to said follower means and a synchro-receiver electrically coupled to the output of said synchro-transmitter.

3. The indicating system set forth in claim 2 wherein said electrical means comprises a sine-cosine resolver having a stator and rotor and providing sine and cosine outputs as a function of the angular deviation of said rotor and stator from a reference alignment.

4. The indicating system set forth in claim 3 wherein said switching signal is responsive to an output of said synchro-transmitter and comprises electro-mechanical means for alternately passing and blocking a light beam at 90° increments and photoelectric means responsive to said light beams as passed and blocked for providing said switching signal.

5. The indicating system set forth in claim 3 wherein said switching signal means comprises a second said synchro-receiver electrically connected to the output of said synchro transmitter and includes means mechanically coupled to the output of said second synchro-receiver for controlling said switching signal.

6. An angular measurement system for measuring the rotation of a body comprising a sine-cosine resolver having a rotor member, a stator member, an electrical source input, and an electrical output, the said output providing first and second alternating current signals, the amplitude of said first signals being a sine function of the angular deviation of said rotor and stator members from a reference alignment and said second signals being a cosine function of said angular deviation, follower means responsive to the rotation of said body for rotating one of said members, means connected to the other one of said members for positioning said other one in a reference position, a source of constant frequency alternating current connected to said resolver input, switching means operatively connected to said sine-cosine resolver for providing as output signals sine outputs when said angular deviation is between 315° and 45° and between 135° and 225° and for providing cosine outputs when said angular deviation is between 45° and 135° and between 225° and 315°, demodulation means responsive to said constant frequency source of alternating current and to said output signals of said switching means for providing a direct current voltage proportional to the output of the said sine-cosine resolver, means coupled to the output of said demodulation means for indicating the sign and amplitude of said direct current voltage, means responsive to said follower means for providing a coarse indication of said angular deviation.

7. The angular measurement system set forth in claim 6 wherein said last named means comprises a synchro-transmitter having a rotor member and stator member, coupling means coupling said transmitter and said body for producing a relative angular deviation of said transmitter rotor and stator members corresponding to the angular deviation between said resolver rotor and stator members, and a synchro-receiver being electrically connected to the output of said synchro-transmitter, visual indicating means being connected to the rotor of said synchro-receiver for giving a coarse indication of the angular position of said body.

8. The angular measurement system set forth in claim 7 wherein one of said members of said resolver comprises first and second electrical coils, the axes of said coils being oriented a relative 90° and said switching means comprises means for energizing the first of said coils for providing a sine output of said resolver and for energizing the second of said coils for providing a cosine output of said resolver.

9. The angular measurement system set forth in claim 8 wherein said switching means comprises a synchro-receiver electrically responsive to the output of said synchro-transmitter and contactor means responsive to an output of said last named synchro-receiver for selectively energizing said first or second said coils.

10. The measurement system set forth in claim 9 wherein said means connected to the other one of said members of said resolver comprises a first suspended pendulum and said coupling means includes a second pendulum suspended by one of said members of said transmitter, the other of said members of said transmitter being fixedly connected to said body.

No references cited.